United States Patent
Runde et al.

(10) Patent No.: US 9,561,791 B2
(45) Date of Patent: Feb. 7, 2017

(54) SYSTEM AND METHOD FOR OPTIMIZING POWER CONSUMPTION IN A HYBRID ELECTRIC VEHICLE

(71) Applicant: Allison Transmission, Inc., Indianapolis, IN (US)

(72) Inventors: Jeffrey K. Runde, Fishers, IN (US); Stephen T. West, New Palestine, IN (US); William J. Hynes, Sheridan, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 23 days.

(21) Appl. No.: 14/840,078

(22) Filed: Aug. 31, 2015

(65) Prior Publication Data

US 2015/0367838 A1    Dec. 24, 2015

Related U.S. Application Data

(63) Continuation of application No. PCT/US2014/020532, filed on Mar. 5, 2014.

(Continued)

(51) Int. Cl.
*B60W 10/06* (2006.01)
*B60W 10/08* (2006.01)
(Continued)

(52) U.S. Cl.
CPC .............. *B60W 20/108* (2013.01); *B60K 6/48* (2013.01); *B60W 10/06* (2013.01); *B60W 10/08* (2013.01);
(Continued)

(58) Field of Classification Search
CPC ....... B60W 20/11; B60W 20/15; B60W 10/06; B60W 10/08; B60W 10/26; B60W 30/18127; B60W 2710/083; B60W 2710/244; B60K 6/48; Y02T 10/6221; Y02T 10/6286; Y10S 903/93
See application file for complete search history.

(56) References Cited

U.S. PATENT DOCUMENTS

| | | | |
|---|---|---|---|
| 5,820,172 | A | 10/1998 | Brigham et al. |
| 7,530,413 | B2 | 5/2009 | Rayl |
| 2006/0175996 | A1 | 8/2006 | Tether |

FOREIGN PATENT DOCUMENTS

| | | |
|---|---|---|
| JP | 2009-040094 A | 2/2009 |
| JP | 2012-020607 A | 2/2012 |

(Continued)

OTHER PUBLICATIONS

International Search Report and Written Opinion issued in PCT/US2014/020532, dated Jun. 18, 2014, 31 pages.

*Primary Examiner* — Aaron L Troost
(74) *Attorney, Agent, or Firm* — Woodard, Emhardt, Moriarty, McNett & Henry LLP

(57) ABSTRACT

A system and method for optimizing the consumption of fuel in a hybrid electric vehicle is disclosed. A Hybrid Efficiency Index (HEI) is used to quantify a relative efficiency advantage achievable with the expenditure of electrical energy at a given power level. Also disclosed is a minimum efficiency threshold useful for determining which HEI values will result in the optimum use of electrical energy throughout the operation of the vehicle. Methods for adjusting the minimum efficiency threshold with respect to regenerative braking events, storage capacity in the energy storage system, along with other aspects are disclosed as well.

26 Claims, 6 Drawing Sheets

Related U.S. Application Data

(60) Provisional application No. 61/782,476, filed on Mar. 14, 2013.

(51) Int. Cl.
| | | |
|---|---|---|
| *B60K 6/48* | (2007.10) | |
| *B60W 10/26* | (2006.01) | |
| *B60W 30/18* | (2012.01) | |
| *B60W 20/00* | (2016.01) | |

(52) U.S. Cl.
CPC ............ *B60W 10/26* (2013.01); *B60W 20/11* (2016.01); *B60W 20/15* (2016.01); *B60W 30/18127* (2013.01); *B60W 2710/0666* (2013.01); *B60W 2710/083* (2013.01); *B60W 2710/244* (2013.01); *Y02T 10/6221* (2013.01); *Y02T 10/6286* (2013.01); *Y10S 903/93* (2013.01)

(56) References Cited

FOREIGN PATENT DOCUMENTS

| WO | WO 2012-104287 A1 | 8/2012 | | |
|---|---|---|---|---|
| WO | WO 2012104267 A1 * | 8/2012 | ............ | B60W 10/02 |

\* cited by examiner

SYSTEM AND METHOD FOR OPTIMIZING POWER CONSUMPTION IN A HYBRID ELECTRIC VEHICLE

CROSS REFERENCE TO RELATED APPLICATIONS

This application is a continuation of International Application No. PCT/US2014/020532 filed Mar. 5, 2014, which claims the benefit of U.S. Provisional Application No. 61/782,476 filed Mar. 14, 2013, the entire disclosures of which are hereby incorporated by reference in their entirety.

BACKGROUND

Hybrid electric vehicles commonly use both the electric and fossil fuel drive systems to minimize fuel consumption. As a result, controlling the hybrid vehicle drive system often includes making some determination of how best to expend electrical power along with (or instead of) burning fossil fuel in the engine. In some circumstances it may be advantageous to favor the use of electrical power to a greater degree where in other circumstances the best fuel economy may be achieved by burning more fuel in the engine and using less electrical power in the electric motor generator. Determining this balance may be difficult and is often counterintuitive because numerous factors may be involved in determining the best fuel economy such as the fuel efficiency of the engine, the quantity and maximum transfer rate of electrical energy available, losses incurred in the transfer of electrical energy at various power levels, as well as the speed of the vehicle, its weight, and numerous other related factors.

SUMMARY

Disclosed is a system and method for optimizing the consumption of power in a hybrid electric vehicle drive system. Included are techniques for optimizing electrical energy and fossil fuel consumption over the full operational cycle from key on to key off, rather than optimizing consumption at only each instantaneous point in time. For example, electrical energy is spent when it will be most beneficial over the long-term rather than expending electrical energy at the optimum power level at any point in time. The system operates to calculate a Hybrid Efficiency Index (HEI) which, in one embodiment, is defined as the change in fuel consumption rate divided by the rate of change in stored electrical energy. At any instantaneous point in the propulsion phase of the hybrid vehicle, the desired powertrain output, the efficiencies of the components, and the engine fuel efficiency are well characterized and known to the hybrid system control logic. Thus the HEI can be calculated for a range of electrical energy levels at any given point in time, or repeatedly throughout the operation of the vehicle, thus continuously quantifying a ratio of the efficiency gain available if electrical energy is used instead of fuel energy for an available electrical power output corresponding to some or all of the current user torque request.

In another aspect, the system includes a method for determining when a particular efficiency gain (HEI value) represents a best use of electrical power. In one disclosed embodiment, the system includes a minimum efficiency level, or target HEI below which the HEI will be considered insufficient for operating the electric motor. The target HEI is adjusted throughout the operation of the vehicle to optimize when the substitution of electrical energy for fossil fuel is most advantageous. In one instance, the target HEI is set low enough to expend all available electrical energy without wasting an opportunity to harvest energy through, for example, regenerative braking. Similarly, in another instance, the minimum efficiency threshold is set at a level where the energy expended over the entire trip equals the regenerative energy captured during the operational cycle, or trip.

In another aspect, the system considers whether the storage capacity of the electrical energy storage system has been sufficient to store and deliver the recaptured energy to the electric motor generator throughout the trip. For example, the system may adaptively observe the energy recaptured throughout the trip and determine an average expected ratio of how much of the vehicle's kinetic energy can be recovered as electrical energy at any given time during the operation of the vehicle. Thus the algorithm can determine if adequate storage capacity is present. For example, a determination of inadequate storage capacity results in one instance in a gradual lowering of the HEI target thus causing electrical energy to be used more frequently.

Similarly, in another aspect of the HEI processing algorithm, a regenerative braking event occurring when the capacity of the energy storage system is limited resulting in a failure to capture some of the available regenerative energy will also result in a lowering of the HEI target causing the electrical motor to be used more frequently to create extra capacity in the energy storage system thus making it more likely the system will recover more energy through regenerative braking.

In another aspect, the minimum efficiency threshold may be adjusted up or down to assist in keeping the energy storage system near a desired storage capacity. This aspect of HEI processing may be beneficial where it is advantageous to keep the energy storage system at approximately a certain charge capacity, for example, to extend its service life.

Further forms, objects, features, aspects, benefits, advantages, and embodiments of the present invention will become apparent from the detailed description and drawings provided herewith.

DETAILED DESCRIPTION

Figure 1:
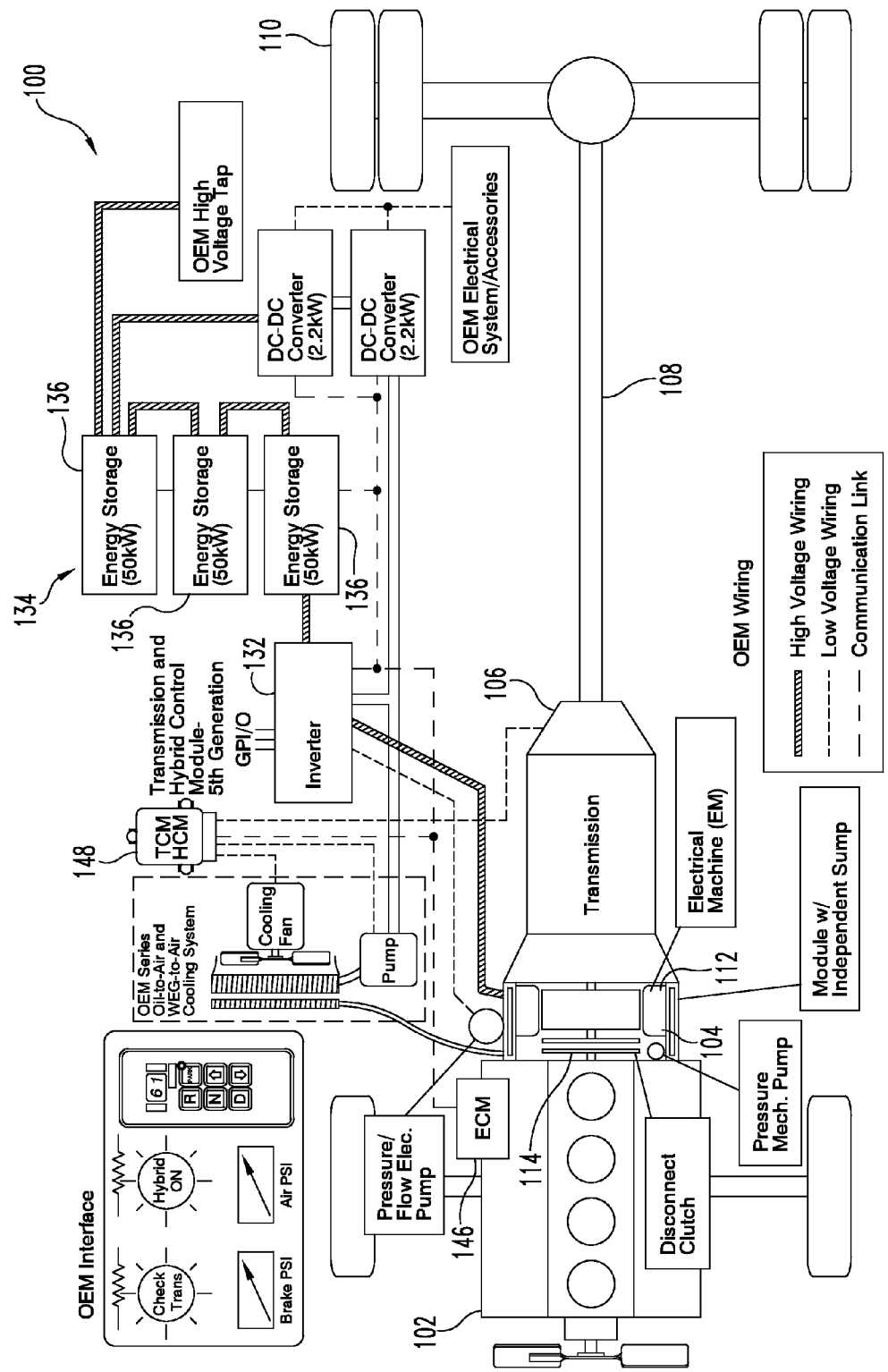
FIG. 1 illustrates a diagrammatic view of one example of a hybrid system.

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on. With reference to the Specification, Abstract, and Claims sections herein, it should be noted that the singular forms "a", "an", "the", and the like include plural referents unless expressly discussed otherwise. As an illustration, references to "a device" or "the device" include one or more of such devices and equivalents thereof.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electric motor generator or electrical machine, commonly referred to as an eMachine 112, and a clutch 114 that operatively connects and disconnects the engine 102 from the eMachine 112 and the transmission 106.

The hybrid system 100 incorporates a number of control systems for controlling the operations of the various components. For example, the engine 102 has an engine control module 146 that controls various operational characteristics of the engine 102 such as fuel injection and the like. A transmission/hybrid control module (TCM/HCM or "the controller") 148 substitutes for a traditional transmission control module and is designed to control both the operation of the transmission 106 as well as the hybrid module 104. The transmission/hybrid control module 148 and the engine control module 146 along with the inverter 132, and energy storage system 134 communicate along a communication link as is depicted in FIG. 1.

In terms of general functionality, the transmission/hybrid control module 148 receives power limits, capacity, available current, voltage, temperature, state of charge, status, and fan speed information from the energy storage system 134 and the various energy storage modules 136 within. In the illustrated example, energy storage system 134 includes three energy storage modules 136 connected together, for example connected together in parallel, to supply high voltage power to the invert 132. The transmission/hybrid control module 148 in turn sends commands for connecting the various energy storage modules 136 so as to supply voltage to and from the inverter 132. From the inverter 132, the transmission/hybrid control module 148 receives a number of inputs such as the motor/generator torque that is available, the torque limits, the inverter's voltage current and actual torque speed. From the inverter 132, it also receives a high voltage bus power and consumption information. The transmission/hybrid control module 148 also monitors the input voltage and current as well as the output voltage and current. The transmission/hybrid control module 148 also communicates with and receives information from the engine control module 146 and in response controls the torque and speed of the engine 102 via the engine control module 146.

In a typical embodiment, the transmission/hybrid control module 148 and engine control module 146 each comprise a computer having a processor, memory, and input/output connections. Additionally, the inverter 132, energy storage system 134, DC-DC converter system 140, and other vehicle subsystems may also contain computers having similar processors, memory, and input/output connections.

Figure 2:
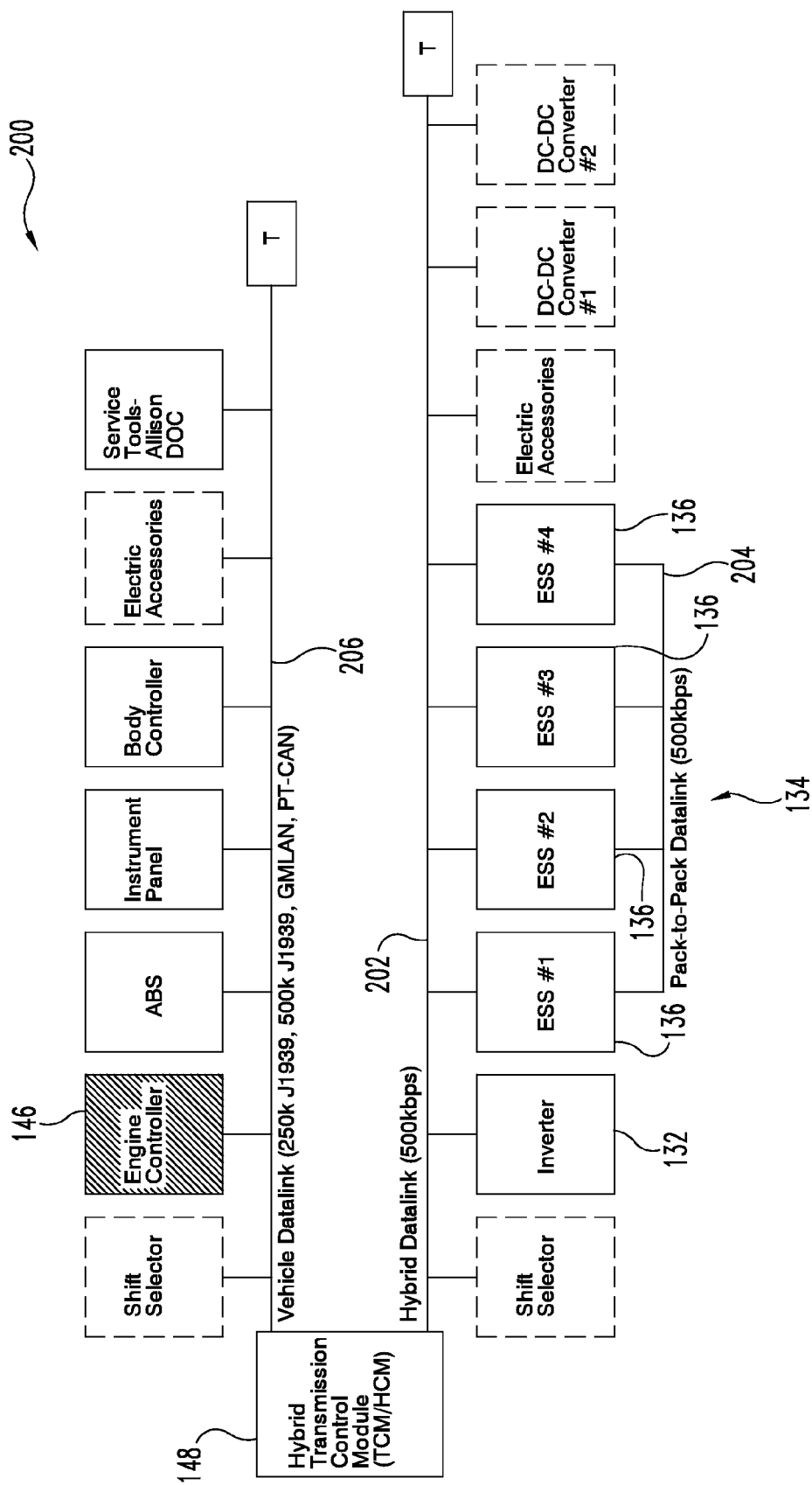
FIG. 2 illustrates a general diagram of an electrical communication system in the FIG. 1 hybrid system.

FIG. 2 shows a diagram of one example of a communication system 200 that can be used in the hybrid system 100. While one example is shown, it should be recognized that the communication system 200 in other embodiments can be configured differently than is shown. The communication system 200 is configured to minimally impact the control and electrical systems of the vehicle. To facilitate retrofitting to existing vehicle designs, the communication system 200 includes a hybrid data link 202 through which most of the various components of the hybrid system 100 communicate. In particular, the hybrid data link 202 facilitates communication between the transmission/hybrid control module 148 and the inverter 132 and the energy storage system 134. Within the energy storage system 134, an energy storage module data link 204 facilitates communication between the various energy storage modules 136. The various components of the hybrid system 100 as well as their function are discussed in further detail in U.S. patent application Ser. No. 13/527,953, filed Jun. 20, 2012 and International Application No. PCT/US/2011/051018, filed Sep. 9, 2011, published as WO 2012/034031 A2, which are hereby incorporated by reference In another aspect, the transmission/hybrid control module 148 controls the operation of the engine 102 and the eMachine 112 to determine how best to use stored electrical energy in relation to burning fossil fuel in the engine 102. This typically involves calculations to determine whether and to what extent the eMachine 112 will provide torque to the drive train 108 to assist engine 102 in providing an output torque to drive train 108 sufficient to fulfill an operator torque request. In one instance, transmission/hybrid control module 148 may direct the eMachine 112 to provide all the necessary output torque causing a high rate of electrical energy transfer from the energy storage system 134 leaving the engine 102 to possibly idle or perhaps be shut down. In another instance, perhaps only moments later, transmission/hybrid control module 148 may control the eMachine 112 to provide a very small percentage of the torque required to fulfill the users output torque requirement controlling engine 102 to provide the remainder.

In one embodiment, transmission/hybrid control module 148 seeks to optimize fuel savings by minimizing the fuel consumed over the entire operational cycle, such as from vehicle start to vehicle shutdown, rather than to optimize the fuel efficiency of the hybrid system 100 at each instant in time. Although optimizing efficiency at each instant in time may be advantageous in determining the optimum power level to draw from the energy storage system 134, the benefit obtained over the operational cycle varies depending on numerous changing factors such as the operating point (e.g. speed and torque) of the hybrid system 100. In some cases, using a relatively large amount of electrical energy results in only a modest fuel savings, while in other situations, expending a relatively small amount of electrical energy results in a substantial fuel savings.

In one embodiment of transmission/hybrid control module 148, the processor or control circuitry is programmed or otherwise designed to consider a wide range of variables and to quantify a range of available trade-offs between using electrical versus fuel energy that are available to hybrid system 100 at any given point in time. In a second aspect, electrical power is used when the trade-off provides the best overall fuel savings. In one embodiment, transmission/hybrid control module 148 calculates a Hybrid Efficiency Index (HEI) which is defined as the change in fuel consumption rate divided by the rate of change in stored electrical energy. In this embodiment of the HEI, the ratio can be thought of as a simple scalar value quantifying the efficiency increase available if electrical power is consumed at a given rate and engine power output is reduced by a corresponding amount. At any instantaneous point in the propulsion phase, when hybrid system 100 is transferring power from the engine 102 and/or the hybrid module 104 through the drive train 108 to wheels 110, the desired output power, the efficiencies of the components, and the engine fuel efficiency are provided to or calculated by hybrid system 100 and made available to transmission/hybrid control module 148. This allows transmission/hybrid control module 148 to calculate the HEI for all possible electrical energy levels that may be delivered by the energy storage system 134 at any particular point in time.

Figure 3:
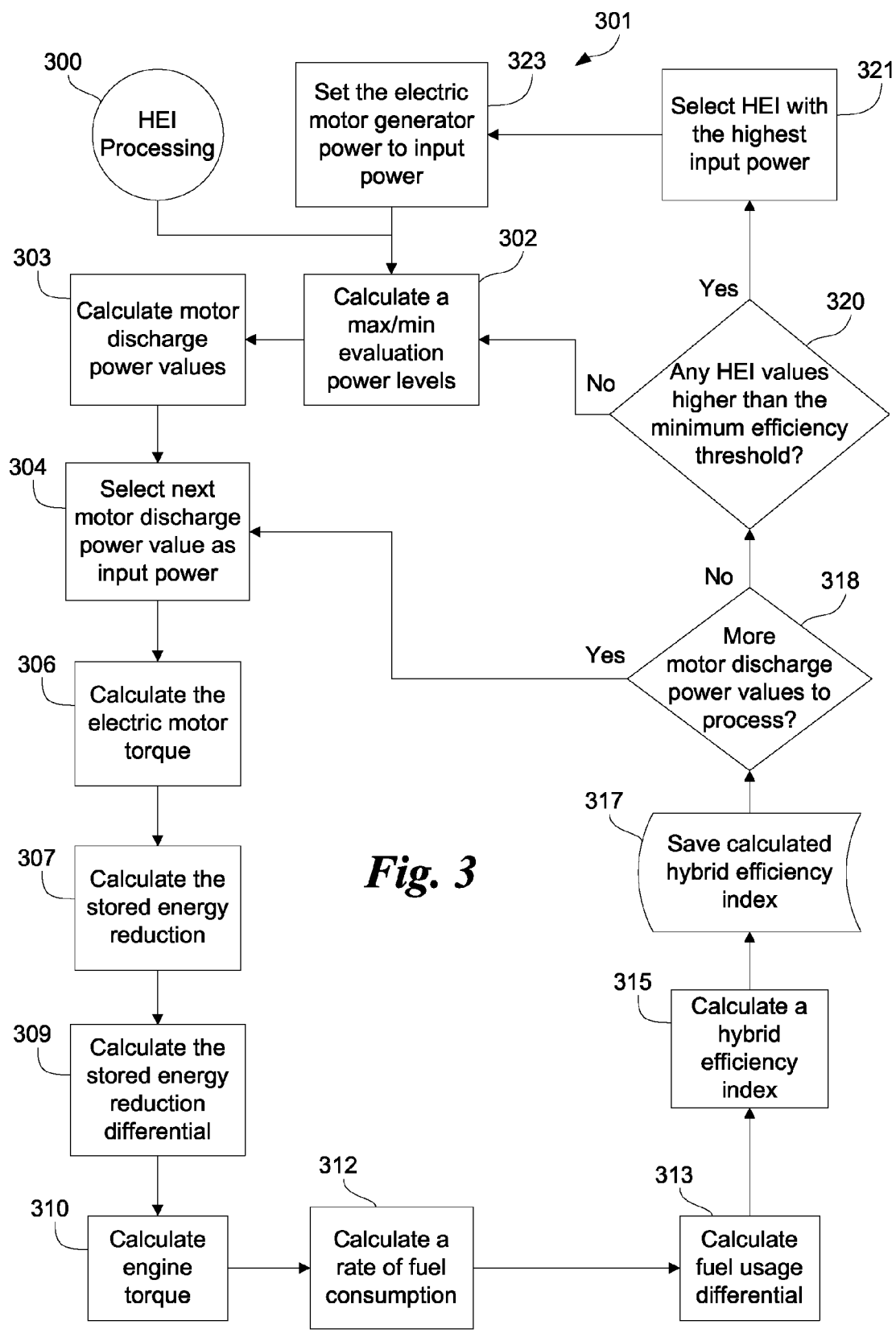
FIG. 3 illustrates a flowchart showing one aspect of the control system of FIG. 1 including stages for calculating the HEI for one or more electric motor discharge power values.

One example of the stages involved in controlling hybrid system 100 after calculating a set of HEI values for all possible electrical power output levels is shown in FIG. 3 at 301. The stages shown at 301 are exemplary of one aspect of overall HEI processing 300 performed by transmission/hybrid control module 148. HEI processing 300, includes various other aspects illustrated in FIGS. 4 through 6 and which may also be calculated asynchronously along with the stages shown at 301. Transmission/hybrid control module 148 performs the stages shown in FIGS. 3 through 6 using a processor or similar computational circuit, programmed or otherwise designed to perform HEI processing as shown and to cause hybrid system 100 to respond accordingly as indicated in the figures and described below.

HEI processing 300 in FIG. 3 includes calculating a maximum evaluation power level and a minimum evaluation power level (302) thus establishing a range of available power output values. The maximum and minimum evaluation power levels generally correspond to operational characteristics of energy storage system 134, eMachine 112, the current power output of engine 102, as well as other related aspects of hybrid system 100. Because the HEI represents the trade-off between burning fuel in the engine versus using electrical energy in eMachine 112, the upper limit of the maximum evaluation power level, in one embodiment, represents the electrical power level required to operate eMachine 112 at a level that would cause it to produce the same mechanical output power that is currently being produced by engine 102 burning fuel to provide a user requested output torque.

However, this calculated electrical power value may exceed the maximum power that can be delivered by energy storage system 134 or utilized by the eMachine 112. For example, energy storage system 134 can only deliver, at most, some maximum power based on its current state of charge, temperature, and various other operating parameters. Likewise, eMachine 112 can only utilize electrical energy at a given maximum rate based on its design constraints and therefore can only deliver some well-known maximum mechanical output power. Therefore, transmission/hybrid control module 148 can determine the maximum evaluation power level by, for example, using the minimum value of either the discharge power limit of energy storage system 134, the maximum useable input power of eMachine 112, or the power value resulting from converting the mechanical power produced by the engine to an equivalent electrical power at the current user torque request. The minimum evaluation power level is determined by calculating a minimum operating consumption power level, such as at idle when the system is under minimal load.

Using the maximum and minimum evaluation power levels, the transmission/hybrid control module 148 calculates a plurality of motor discharge power values (303) representing the set of electrical energy levels for which a Hybrid Efficiency Index will be calculated. In one embodiment, the plurality of motor discharge power values is determined by incrementing the power level for each discharge power in the set of values by a preset value or increment over the previous value. The increment may be adjustable and may be dependent on aspects of hybrid system 100 such as the smallest power adjustment to which inverter 132 and eMachine 112 are able to respond to. In another embodiment, the plurality of discharge power levels is determined by dividing the available range between the maximum and minimum discharge power by a preset number such as 100 or 50.

The transmission/hybrid control module 148 iterates through the plurality of motor discharge power values (304) calculating the HEI for each motor discharge power value given the current operator torque request. To calculate the HEI, transmission/hybrid control module 148 calculates an electric motor torque (306) using the current motor discharge power value as the input power in the calculation. In one embodiment, the electric motor torque is calculated by converting the input power from electrical to mechanical energy and dividing by the motor speed. Other suitable calculations may be used as well.

A reduction in energy storage is also calculated (307) where the stored energy reduction indicates the reduction in available energy that would result from withdrawing the input power from the energy storage device in order to create the calculated electric motor torque. The stored energy reduction includes the electric power consumed by the motor while also, for example, taking into account losses in energy storage system 134 resulting from the transfer of energy from energy storage system 134 to eMachine 112. These losses include losses due to heating caused by resistance to the transfer of energy. For example, where energy storage system 134 includes batteries, power losses in the batteries can be characterized in terms of resistance, power, and voltage as $R*(P/E)^2$ where R is the resistance of the battery pack, P is the input power to eMachine 112 (the power withdrawn from the battery in this case), and E is the input voltage to eMachine 112.

A similar stored energy reduction calculation is performed using the minimum evaluation power to determine the minimum stored energy reduction. Both the minimum stored energy reduction, and the stored energy reduction are used to calculate a stored energy reduction differential (309).

An engine torque for the engine is calculated (310) which is reduced by the torque output calculated for the electric motor. In this way, the engine torque calculation includes the previously calculated electric motor torque calculation from stage 306 indicating that engine 102 reduces its torque output in proportion to the torque produced by eMachine 112. Thus, both engine 102 and eMachine 112 work together to fulfill the operator power (i.e. torque) request and the motor torque operates as a replacement for some or all of the engine torque output.

A rate of fuel consumption for engine 102 is calculated at 312 for both the current input power, and the minimum evaluation power. Fuel consumption rates for a given engine speed, torque, and output power are generally well characterized by the manufacturer and made available to transmission/hybrid control module 148 from engine control module 146 as engine 102 is operating. These mappings are used by transmission/hybrid control module 148 to determine the quantity of fuel used.

A fuel usage differential is calculated at 313 by, for example, subtracting the rate of fuel consumption from the minimum evaluation fuel consumption rate determined from the minimum evaluation power. In one embodiment of the Hybrid Efficiency Index (HEI), the HEI is calculated (315) as the fuel usage differential calculated in stage 313 divided by the stored energy reduction differential calculated in stage 309. The calculated Hybrid Efficiency Index is saved (317), for example, at least until an HEI has been calculated for all the motor discharge power values. If more motor discharge power values remain to process (318), the HEI calculation repeats for another motor discharge power value at stage 304.

If all the motor discharge power values calculated in stage 303 have been processed, the transmission/hybrid control module 148 determines if any of the calculated HEI values saved in stage 317 are higher than a current minimum efficiency threshold (320). If not, calculation of a new set of HEI values is performed and processing begins again at stage 302. Processing the HEI loop may be programmed or otherwise designed to execute multiple times per second, for example 50 times per second, but may be executed more quickly such as 100 times per second or even faster, or less quickly such as five or 10 times per second or slower depending on the embodiment and system constraints. Also, some time lag may be incorporated into the transition from stage 320 to 302 when no HEI values are higher than the minimum efficiency threshold. In some embodiments it may be advantageous to wait some period of time before repeating the HEI calculations for a new set of motor discharge power values.

HEI processing 301 completes with adjusting the eMachine 112 input power if applicable. In one embodiment, if at least one of the HEI values calculated in stage 315 and saved in stage 317 is higher than the minimum efficiency threshold (320), the transmission/hybrid control module 148 selects the HEI value that is both higher than the minimum efficiency threshold and has the highest input power (321). The input power for the selected HEI value is used by the transmission/hybrid control module 148 as the new input power setting for eMachine 112. The transmission/hybrid control module 148 then signals the relevant components of hybrid system 100 such as inverter 132, energy storage system 134, and eMachine 112 to operate eMachine 112 in the electric motor mode generating an output torque substantially equal to the input torque used in the calculation of the selected HEI value. At about the same time, engine control module 146 is signaled by the transmission/hybrid control module 148 to reduce engine output torque by the same amount thus trading engine 102 torque for eMachine 112 torque. HEI processing then returns to stage 302 where a new set of HEI calculations is made evaluating anew the most efficient trade-off between electrical energy and fuel burn in relation to current requested torque output and the performance constraints of hybrid system 100.

As noted above, the calculation of the HEI values for a given set of motor discharge power values is calculated repeatedly during the operation of the hybrid system 100, perhaps multiple times per second in some embodiments. However other aspects of HEI processing include adjusting the minimum efficiency threshold which operates to select only the best opportunities for using electrical energy (see stage 320) in place of burning fuel in engine 102.

Figure 4:
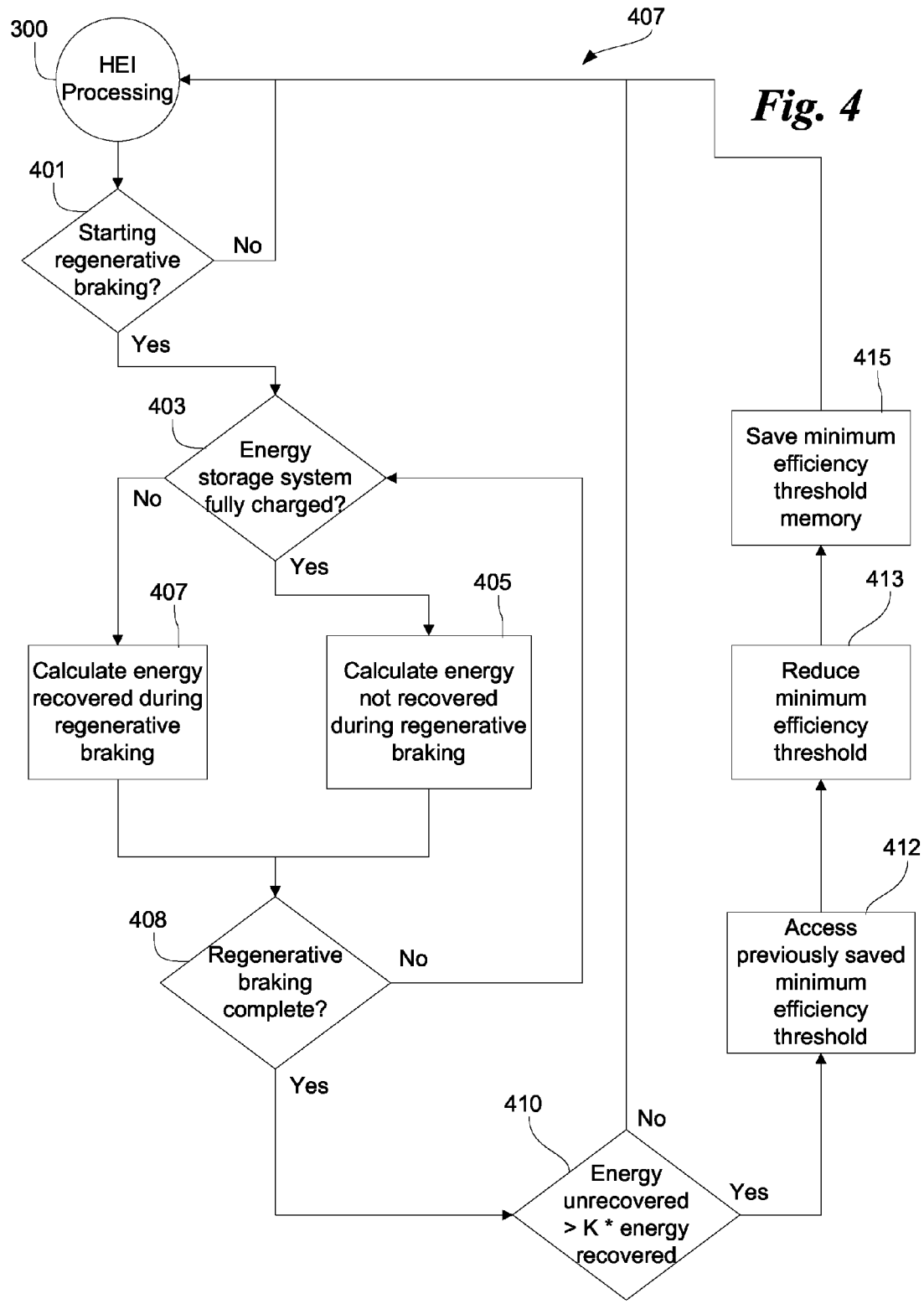
FIG. 4 illustrates a flowchart showing another aspect of the control system of FIG. 1 including stages for adjusting the minimum efficiency threshold after a regenerative braking event.
Figure 5:
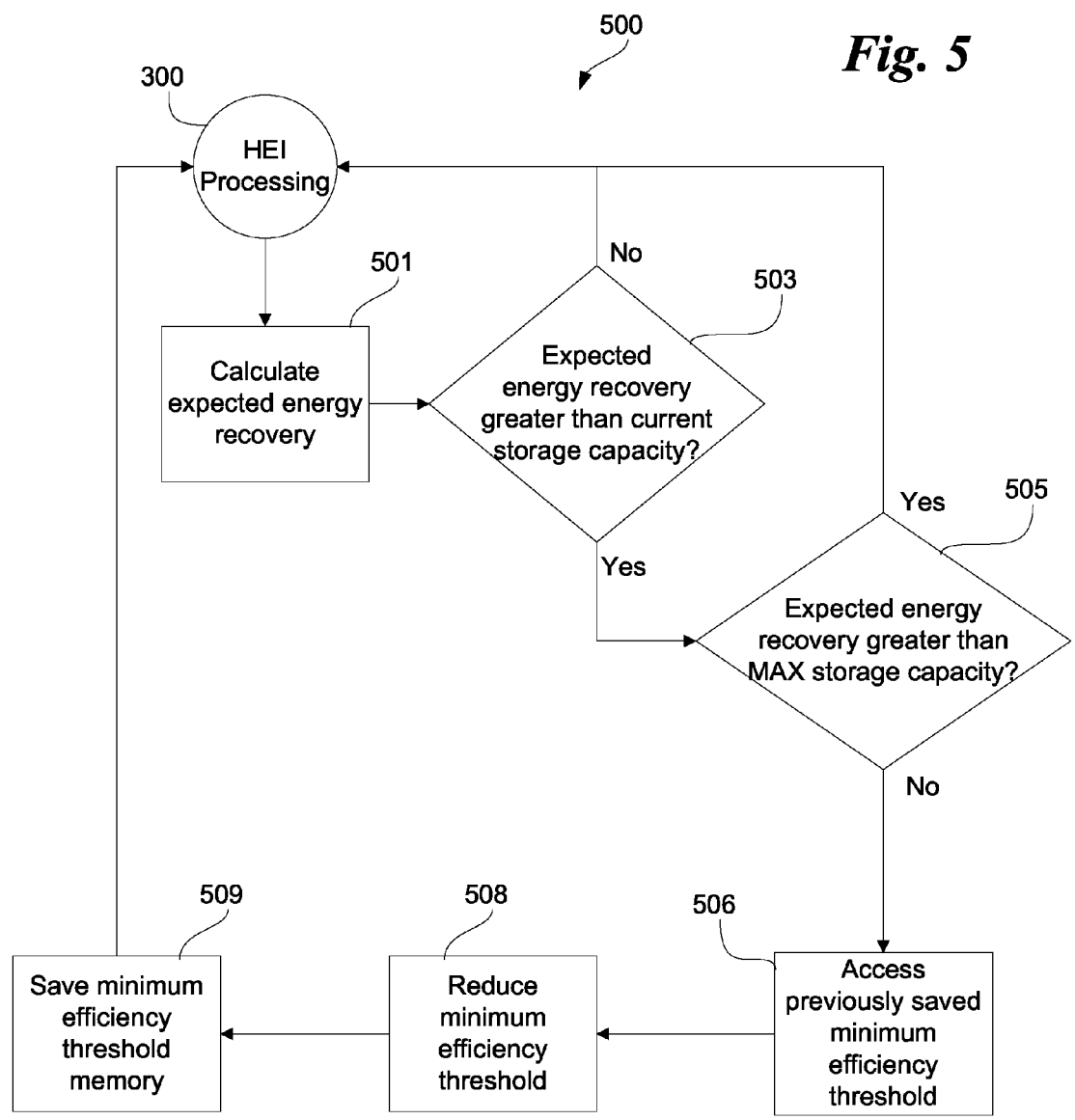
FIG. 5 illustrates a flowchart showing another aspect of the control system of FIG. 1 including stages for adjusting the minimum efficiency threshold in relation to expected energy recovery.

For example, another aspect of HEI processing 300 is shown in FIG. 4 at 400 and includes adjusting the minimum efficiency threshold (or HEI target) to ensure that regenerative energy is captured and not lost because of inadequate available storage in energy storage system 134. HEI processing 300 seeks to ideally maintain the minimum efficiency threshold just low enough so that energy expended over the entire trip or operating cycle is about equal to the regenerative energy captured during the trip. However, mismanagement of power stored in energy storage system 134 may result in the loss of the opportunity to recover energy during a regenerative braking event, for example, in the case where the energy storage system is already full and no further energy can be recovered. Therefore, in one embodiment of HEI processing 300, the minimum efficiency threshold is reduced where energy is being lost in regeneration. Reducing the minimum efficiency threshold has the effect of increasing the likelihood eMachine 112 will be used because it results in more evaluation power levels from stage 302 translating into candidate HEI values in stage 321 (See FIG. 3).

In the embodiment illustrated in FIG. 4, transmission/hybrid control module 148 determines if a regenerative braking event is starting (401) and if not, processing continues as before. This determination can be made, for example, by detecting torque in transmission 106 coming from wheels 110 through drive train 108. Such an event may occur during vehicle deceleration alone, or when frictional braking is applied as well. Further, such an event may occur anytime a torque is applied to eMachine 112 from the hybrid vehicle drive train 108 and transmission 106.

If a regenerative braking event is occurring, (401) transmission/hybrid control module 148 determines whether the energy storage system 134 is fully charged (403), for example by communicating with energy storage system 134 over hybrid data link 202. If energy storage system 134 is fully charged, transmission/hybrid control module 148 calculates the energy that will not be recovered during the regenerative braking event (405). If the energy storage system is not fully charged (403), transmission/hybrid control module 148 calculates the energy that is recovered during the regenerative braking process (407) as torque from transmission 106 spins eMachine 112 operating in the generator mode to produce electric power. When the regenerative braking event is complete (408), transmission/hybrid control module 148 calculates whether the energy unrecovered is greater than the energy recovered (410). If not, HEI processing continues at stage 300. If the energy unrecovered is greater than a fraction K of the energy recovered (410) transmission/hybrid control module 148 accesses the previously saved minimum efficiency threshold (412) and reduces the minimum efficiency threshold (413). This reduction may be for example, an incremental reduction by a small scalar value such as 0.1 or 0.5, or some other value. In other embodiments, the reduction may be calculated depending on the current value of the minimum efficiency threshold thus, for example, reducing the minimum efficiency threshold by a greater amount if the value is higher or by a lesser amount if it is lower. The modified minimum efficiency threshold is saved by the controller (415) and is useable throughout HEI processing 300 such as in stage 320 when selecting HEI values calculated from the set of evaluation power levels.

In another aspect, the minimum efficiency threshold may be adjusted using an offset. In one embodiment, the offset is determined based on maintaining or approximating a desired storage capacity in the energy storage system 134. For example, for embodiment of the energy storage system 134 that includes one or more battery cells, it may be well-known from the battery cell manufacturer that the batteries perform best when kept between, for example, 40% and 70% charged. Therefore an offset may be applied to the minimum efficiency threshold to adjust the threshold lower or higher to maintain this approximate state of charge in energy storage system 134. In another embodiment, the offset may be incorporated into the operating logic of transmission/hybrid control module 148 if the offset is maintained in place for an extended period of time. This process of incorporating the offset may occur automatically, such as by adaptive logic which, for example, automatically includes the offset into the minimum efficiency threshold calculations after the offset has been maintained for a preset number of days, or the incorporation process may be manual manually activated when the logic in the processor or processing circuit reprogrammed or reset by a technician.

In another aspect of HEI processing related to the capacity of energy storage system 134, the transmission/hybrid control module 148 observes the energy recaptured and adaptively learns the expected ratio of kinetic energy that can be recovered across the vehicle speed envelope. As the vehicle is moving, the algorithm can use the expected ratio to determine if adequate storage capacity is present at any given time. This aspect of HEI processing is also performed by the transmission/hybrid control module 148 and illustrated in FIG. 5 at 500. An expected energy recovery is calculated at 501. In one embodiment, the expected energy recovery is calculated in transmission/hybrid control module 148 by averaging recent recovered energy quotients where the recovered energy quotients are each calculated as the ratio of an actual recovered energy divided by a maximum recoverable energy. The maximum recoverable energy can be determined as a function of the mass and velocity of the vehicle, both of which are either made available to transmission/hybrid control module 148 by hybrid system 100, or are calculated by transmission/hybrid control module 148.

Transmission/hybrid control module 148 determines if the expected energy recovery is greater than the current storage capacity (503). If so, HEI processing continues at 300. If the expected energy recovery is less than the current storage capacity (503) then transmission/hybrid control module 148 checks to determine if the expected energy recovery is greater than the maximum storage capacity in energy storage system 134 (505). If not, HEI processing continues at 300. If the expected energy recovery is greater than the maximum storage capacity (505), the previously saved minimum efficiency threshold is accessed from memory (506) and transmission/hybrid control module 148 reduces the minimum efficiency threshold (508) as discussed above. The reduced minimum efficiency threshold is also saved (509) for use throughout all aspects of HEI processing 300, for example in stages 320, 412, and 506.

In another aspect of HEI processing 300, the transmission/hybrid control module 148 seeks to maintain a minimum efficiency threshold that is as high as possible. Energy is extracted from the energy storage system 134 to power the vehicle or assist engine 102 using eMachine 112 at a given power level when the calculated HEI at that power level exceeds the current minimum efficiency threshold. eMachine 112 will continue to provide some or all of the user's torque request until the HEI drops below the current minimum efficiency threshold. Transmission/hybrid control module 148 can then calculate the quantity of energy expended during this particular propulsion event, and can also determine how much, if any, of this energy would have been expended if the minimum efficiency threshold had been set to a predetermined evaluation efficiency threshold that is higher than the current minimum efficiency threshold. By comparing the energy expended with the energy that would have been expended at the higher evaluation threshold, transmission/hybrid control module 148 can determine whether a higher minimum efficiency threshold will result in a more judicious use of available electrical power resulting in a higher fuel efficiency.

Figure 6:
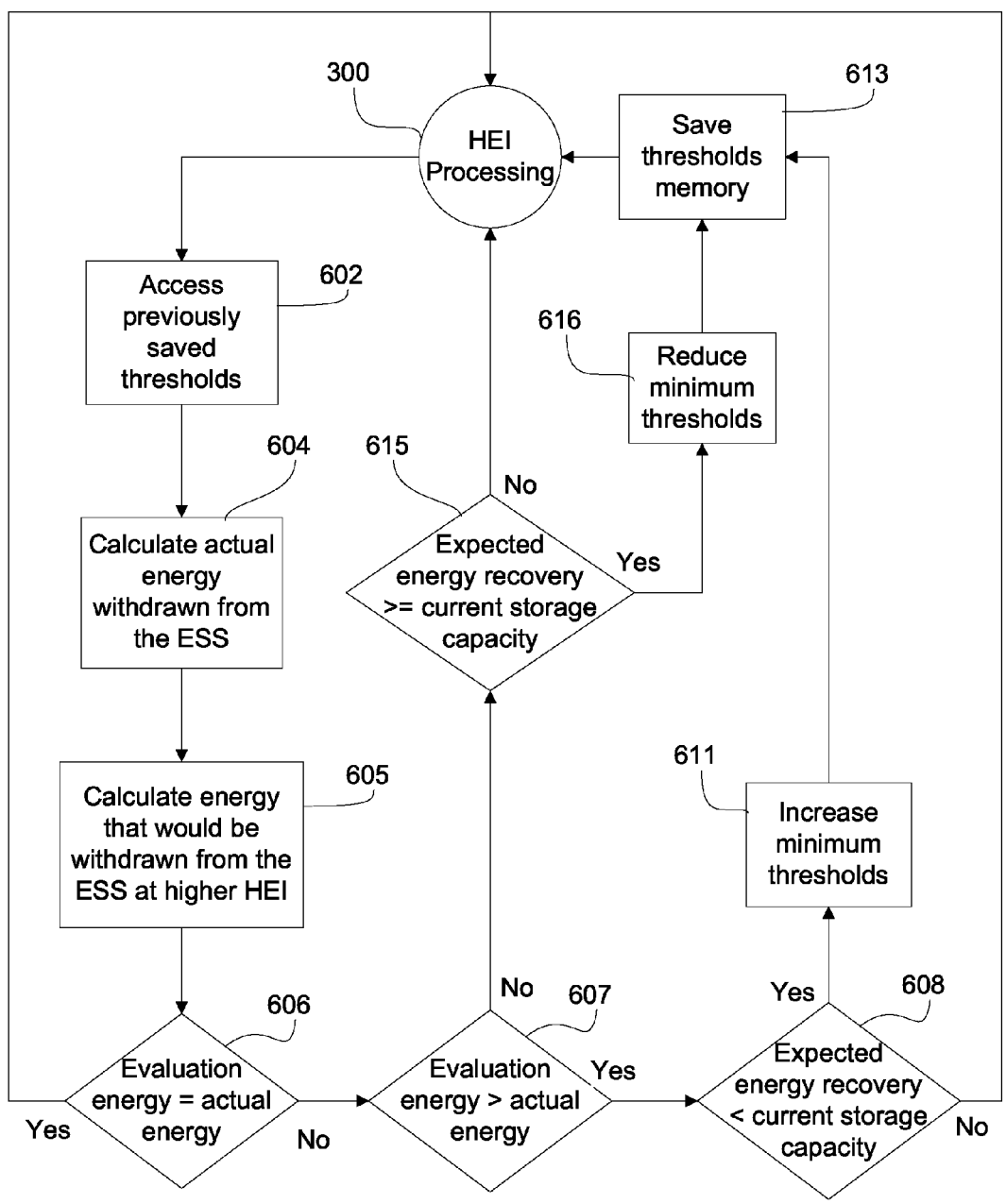
FIG. 6 illustrates a flowchart showing another aspect of the control system of FIG. 1 including stages for adjusting the minimum efficiency threshold in relation to an evaluation threshold.

One embodiment of the stages involved in using an evaluation efficiency threshold to calculate adjustments to the current minimum efficiency threshold are illustrated in FIG. 6 at 600. The transmission/hybrid control module 148 accesses the previously saved minimum efficiency threshold and a previously saved evaluation efficiency threshold at 602. The actual energy usage is calculated based on information obtained from energy storage system 134 during propulsion events (604). In one embodiment, energy usage is calculated during the propulsion phase by integrating the storage discharge rate over time yielding a value representing an energy usage for the time the HEI was above the minimum efficiency threshold and eMachine 112 was withdrawing power from energy storage system 134. The transmission/hybrid control module 148 can then calculate the energy that would have been withdrawn from energy storage system 134 using the higher evaluation threshold (605).

The higher evaluation threshold is used to determine whether the evaluation threshold would have resulted in higher power expenditures. If the evaluation energy and the actual energy expended are equal (606), HEI processing continues at 300. If the evaluation energy and the actual energy are not equal, transmission/hybrid control module 148 determines if the evaluation energy is greater than the actual energy withdrawn from energy storage system 134 at stage 607. If so, transmission/hybrid control module 148 compares the expected energy recovery with the current storage capacity (609). If the expected energy recovery is not less than the current storage capacity, HEI processing continues at 300. If the expected energy recovery is less than the current storage capacity in energy storage system 134 (609), the minimum efficiency threshold is increased (611), for example by some incremental amount, by a computed value as discussed above, or set equal to the evaluation threshold, and the newly increased minimum efficiency threshold is saved to the controller memory (613). In this case, the minimum efficiency threshold is raised because the energy that could have been expended at the higher evaluation threshold is greater than the energy that was expended, and energy storage system 134 can still hold more energy than it expects to recover. Therefore, transmission/hybrid controller 148 is justified in saving a little more energy, using a little less, and thus raises the minimum threshold.

Continuing with the stages at 600 in FIG. 6, if the evaluation energy is less than the actual energy (607), transmission/hybrid control module 148 evaluates whether the expected energy recovery is greater than or equal to the current storage capacity (615). If not, HEI processing continues at 300. If the expected energy recovery is greater than or equal to the current storage capacity (615), the minimum efficiency threshold and the evaluation threshold are both reduced (616), for example, as discussed above, and the newly reduced thresholds are saved in the memory in transmission/hybrid control module 148 (613) and HEI processing continues at (300). In this case, the actual energy recovered is the same or greater than the current threshold, and energy storage system 134 likely cannot hold the energy the system expects to recover from regeneration. This indicates too much energy is being stored meaning the minimum efficiency threshold should be reduced to increase the likelihood the excess energy will be expended rather than wasted.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A method of controlling a hybrid system, comprising:
    calculating a fuel consumption rate for an engine using a controller in communication with the engine, the engine configured to consume a fuel to produce an engine output torque;
    calculating a target electric motor output torque using the controller, the target electric motor output torque calculated by the controller using a predicted change in a fuel consumption rate and a predicted change in a stored electrical energy caused by a predicted consumption of the stored electrical energy by an electric motor generator;
    controlling the electric motor generator to produce an actual electric motor output torque that is substantially equal to the target electric motor output torque using the controller; and
    controlling the engine to reduce the engine output torque by an amount corresponding to the target electric motor output torque using the controller.

2. The method of claim 1, wherein the predicted change in the stored electrical energy is a difference between a stored energy reduction and a minimum stored energy reduction.

3. The method of claim 1, wherein the predicted change in the fuel consumption is a difference between the fuel consumption rate and a minimum evaluation fuel consumption rate.

4. The method of claim 1, wherein the act of calculating the target electric motor output torque includes calculating an electric motor output torque producible by the electric motor generator, the controller calculating the electric motor output torque using an available energy representing a quantity of energy stored in an energy storage system electrically connected to the electric motor generator, wherein the energy storage system and the electric motor generator are responsive to the controller.

5. The method of claim 1, wherein the act of calculating the target electric motor output torque includes calculating a stored energy reduction representing a reduction in the quantity of energy stored in the energy storage system that would result from withdrawing an input power from the energy storage device.

6. The method of claim 1, wherein the act of calculating the target electric motor output torque includes calculating an engine torque, wherein the engine and electric motor generator operate together to provide an output torque sufficient to fulfill an operator torque request.

7. The method of claim 6, wherein the act of calculating the target electric motor output torque includes calculating the fuel consumption rate using the engine torque.

8. The method of claim 1, wherein the act of calculating the target electric motor output torque includes calculating a Hybrid Efficiency Index (HEI) equal to the predicted change in the fuel consumption divided by the predicted change in the stored electrical energy, wherein the electrical energy is stored in an energy storage system electrically connected to the electric motor generator and responsive to the controller.

9. The method of claim 8, further comprising:
    calculating a minimum efficiency threshold using the controller;
    determining if the energy storage system is fully charged using the controller;
    determining an energy recovered by the energy storage system from the electric motor generator operating in a generator mode using the controller, wherein the energy storage system is not fully charged;
    calculating an unrecovered energy not recovered by the electric motor generator operating in the generator mode using the controller, wherein the energy storage system is in the fully charged state; and
    reducing the minimum efficiency threshold using the controller if the energy unrecovered exceeds at least a fraction of the energy recovered.

10. The method of claim 9, further comprising:
    calculating an expected energy recovery using the controller, the expected energy recovery calculated using a current vehicle kinetic energy and an expected energy recovery ratio;
    reducing the minimum efficiency threshold using the controller if the expected energy recovery is greater than a current storage capacity and the expected energy recovery does not exceed a maximum storage capacity.

11. The method of claim 10, wherein the expected energy recovery ratio is calculated using the controller by calculating an average of two or more recovered energy quotients, wherein the recovered energy quotients are calculated as a ratio of an actual recovered energy divided by a maximum recoverable energy.

12. The method of claim 8, further comprising:
    calculating an actual energy withdrawn from the energy storage system when the electric motor generator is operating in the electric motor mode and the hybrid efficiency index is greater than or equal to the minimum efficiency threshold using the controller;
    calculating an evaluation energy using the controller, wherein the evaluation energy represents energy that would have been withdrawn from the energy storage system if the electric motor generator was operating in the electric motor mode when the hybrid efficiency index was greater than or equal to an evaluation efficiency threshold that is higher than the minimum efficiency threshold;
    using the controller to increase the minimum efficiency threshold if the evaluation energy is greater than the actual energy withdrawn from the energy storage system and the expected energy recovery is less than the current storage capacity; and using the controller to reduce the minimum efficiency threshold if the evaluation energy is less than the actual energy withdrawn from the energy storage system and the expected energy recovery is greater than or equal to the current storage capacity.

13. The method of claim 8, further comprising:
using the controller to calculate a maximum evaluation power and a minimum evaluation power;
using the controller to calculate a plurality of motor discharge power values, wherein the plurality of motor discharge power values are less than or equal to the maximum evaluation power and greater than or equal to the minimum evaluation power;
using the controller to calculate a plurality of HEI values, wherein the controller uses the plurality of motor discharge power values to calculate corresponding HEI values;
using the controller to determine a maximum HEI value from the plurality of HEI values wherein the maximum HEI value has the highest corresponding motor discharge power value of one or more HEI values that are greater than the minimum efficiency threshold; and
setting the target electric motor output torque to correspond with the motor input power used to calculate the maximum HEI value using the controller.

14. The method of claim 8, wherein the controller does not operate the electric motor generator in the electric motor mode if the hybrid efficiency index is less than the minimum efficiency threshold.

15. A method of controlling a hybrid system, comprising:
calculating one or more fuel consumption rates for an engine sufficient to produce corresponding one or more engine output torque values using a controller, wherein the engine is configured to consume fuel to produce an engine output torque;
calculating one or more electric power input levels for an electric motor generator operating in electric motor mode sufficient to produce corresponding one or more target electric motor output torque levels, wherein the engine and the electric motor generator are responsive to the controller, wherein the engine, electric motor generator, and the controller are included in the hybrid system, and wherein the controller calculates engine output torque values to correspond with electric motor output torque levels to determine one or more predicted hybrid system output torque values;
using the one or more fuel consumption rates and the one or more electric power input levels to calculate one or more predicted changes in the fuel consumption rates and one or more predicted changes in stored electrical energy corresponding to the one or more electric power input levels;
using the controller to select a target engine output torque value and a corresponding target electric motor output torque level based on the corresponding predicted changes in fuel consumption rates and predicted changes in stored electrical energy, wherein the corresponding combined hybrid system output torque value is sufficient to fulfill an operator output power request;
controlling the electric motor generator to produce an actual electric motor output torque that is substantially equal to the selected target electric motor output torque using the controller; and controlling the engine to produce an actual engine output torque that is substantially equal to the corresponding target engine output torque using the controller.

16. The method of claim 15, further comprising:
calculating a maximum evaluation power and a minimum evaluation power using the controller, wherein the one or more target electric motor output torque levels are less than or equal to the maximum evaluation power and greater than or equal to the minimum evaluation power;
wherein the maximum evaluation power is calculated using the minimum of the following: A maximum storage system output power for an energy storage system providing power to the electric motor generator, a maximum electric motor input power, and an electrical power sufficient to cause the electric motor generator to produce an electric motor power output substantially equal to a current engine power output.

17. The method of claim 15, wherein the one or more electric motor torques are calculated by converting the corresponding one or more electric motor power levels to an equivalent mechanical energy level and dividing by an electric motor speed.

18. The method of claim 15, further comprising:
calculating one or more stored energy reduction values using the controller, the one or more stored energy reduction values calculated using corresponding target electric motor output torque values from the one or more target electric motor output torque values.

19. The method of claim 18, wherein the one or more stored energy reduction values are calculated by computing one or more reductions in a stored energy that would result from operating the electric motor generator to produce the one or more corresponding target electric motor output torque levels.

20. The method of claim 18, wherein calculating the one or more stored energy reduction values includes calculating a corresponding heat energy loss caused by an energy storage system resistance of an energy storage system electrically connected to the electric motor generator, an energy storage system voltage, and an energy storage system current.

21. The method of claim 18, further comprising:
calculating a minimum stored energy reduction using the controller, wherein the minimum stored energy reduction is calculated by calculating the reduction in the stored energy that would result from operating the electric motor generator using an electric power input level substantially equal to a minimum evaluation power.

22. The method of claim 21, further comprising:
calculating one or more stored energy reduction differentials using the controller, the stored energy reduction differentials defining a difference between corresponding stored energy reduction values and the minimum stored energy reduction.

23. The method of claim 15, further comprising:
calculating a minimum fuel consumption rate using the controller;
calculating one or more fuel consumption differentials using the controller, the fuel consumption differentials defining a difference between corresponding fuel consumption rates and the minimum fuel consumption rate.

24. The method of claim 15, further comprising:
calculating a minimum fuel consumption rate using the controller;

calculating one or more fuel consumption differentials using the controller, the fuel consumption differentials defining a difference between corresponding one or more fuel consumption rates and the minimum fuel consumption rate;

calculating one or more stored energy reduction values using the controller, the one or more stored energy reduction values calculated using the corresponding one or more electric power input levels, wherein the one or more stored energy reduction values represent one or more predicted reductions in stored energy caused by the corresponding one or more electric power input levels;

calculating a minimum stored energy reduction using the controller;

calculating one or more stored energy reduction differentials using the controller, the one or more stored energy reduction differentials defining a difference between corresponding one or more stored energy reduction values and the minimum stored energy reduction; and calculating one or more efficiency indexes using the controller, the controller calculating the one or more efficiency indexes by dividing the corresponding one or more fuel consumption differentials by the corresponding one or more stored energy reduction differentials.

25. The method of claim 15, further comprising:

calculating an expected energy recovery using the controller, the expected energy recovery calculated using a current vehicle kinetic energy and an expected energy recovery ratio, wherein the expected energy recovery ratio is calculated by averaging together two or more recovered energy quotients, and wherein the two or more recovered energy quotients are calculated as a ratio of an actual recovered energy divided by a maximum recoverable energy;

calculating a minimum efficiency threshold using the controller, wherein the minimum efficiency threshold is calculated using an energy recovered by the electric motor generator, and an energy unrecovered by the electric motor generator, the electric motor generator operating in the generator mode; and reducing the minimum efficiency threshold using the controller if the energy unrecovered exceeds at least a fraction of the energy recovered, or if the expected energy recovery is greater than a current electrical energy storage capacity in the hybrid system and the expected energy recovery does not exceed a maximum storage capacity.

26. The method of claim 25, further comprising:

calculating one or more efficiency indexes using the corresponding one or more predicted changes in the fuel consumption rate and the one or more predicted changes in stored electrical energy using the controller by dividing the individual predicted changes in the fuel consumption by the corresponding predicted change in the stored electrical energy;

wherein the actual electric motor output torque and the actual engine output torque correspond to a target efficiency index selected by the controller that is greater than or equal to the minimum efficiency threshold.

* * * * *